(12) United States Patent
Nguyen et al.

(10) Patent No.: US 12,342,423 B2
(45) Date of Patent: Jun. 24, 2025

(54) MODIFYING MOBILE DEVICE CONDITIONS OR STATES SYSTEMS AND METHODS

(71) Applicant: T-Mobile USA, Inc., Bellevue, WA (US)

(72) Inventors: Phi Hoang Nguyen, Bellevue, WA (US); Veeraseshamamba Venigalla, Southlake, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 353 days.

(21) Appl. No.: 17/861,163

(22) Filed: Jul. 8, 2022

(65) Prior Publication Data

US 2024/0015499 A1 Jan. 11, 2024

(51) Int. Cl.
*H04W 8/20* (2009.01)
*H04W 8/24* (2009.01)
*H04W 8/26* (2009.01)
*H04W 16/22* (2009.01)

(52) U.S. Cl.
CPC ............... *H04W 8/20* (2013.01); *H04W 8/24* (2013.01); *H04W 8/26* (2013.01); *H04W 16/22* (2013.01)

(58) Field of Classification Search
CPC ......... H04W 8/20; H04W 8/26; H04W 16/22; H04W 8/24
See application file for complete search history.

(56) References Cited

U.S. PATENT DOCUMENTS

| 5,428,679 | A | 6/1995 | French |
| 5,907,800 | A | 5/1999 | Johnson et al. |
| 6,574,465 | B2 | 6/2003 | Marsh et al. |
| 7,072,639 | B2 | 7/2006 | Marsh et al. |
| 7,171,460 | B2 | 1/2007 | Kalavade et al. |
| 7,221,387 | B2 | 5/2007 | Fernandez et al. |
| 7,221,945 | B2 | 5/2007 | Milford et al. |
| 7,477,907 | B2 | 1/2009 | Koch et al. |
| 7,593,396 | B2 | 9/2009 | Bhandari et al. |

(Continued)

FOREIGN PATENT DOCUMENTS

| EP | 1617642 A2 | 1/2006 |
| EP | 1924048 A1 | 5/2008 |

(Continued)

*Primary Examiner* — Congvan Tran
(74) *Attorney, Agent, or Firm* — Perkins Coie LLP

(57) ABSTRACT

Systems and methods for taking actions in response to a condition or state of a mobile device are disclosed. The system receives interactions between agents and subscribers of a telecommunications service provider relating to use of the mobile device to access a network. The system accesses subscriber data for the subscriber based on the interactions, the subscriber data including a coverage map. The system determines a usage pattern characterizing the use of the mobile device to access the network. And the system uses the interactions, the subscriber data, and the usage pattern to recommend an action to respond to a condition or state associated with the mobile device. The action can include updating the mobile device, changing a device state, or replacing the mobile device. In some implementations, the system trains and uses a machine learning model to recommend the action and/or to identify and access the subscriber data.

19 Claims, 5 Drawing Sheets

(56) References Cited

U.S. PATENT DOCUMENTS

| | | |
|---|---|---|
| 8,326,272 B1 | 12/2012 | Patro |
| 8,521,129 B2 | 8/2013 | Gudlavenkatasiva et al. |
| 8,776,111 B1 | 7/2014 | Eldering et al. |
| 8,811,175 B2 | 8/2014 | Sharma et al. |
| 9,390,423 B1 | 7/2016 | Eldering et al. |
| 9,451,434 B2 | 9/2016 | Baldwin et al. |
| 9,635,402 B1 | 4/2017 | Toner et al. |
| 9,635,486 B2 | 4/2017 | Ford et al. |
| 9,679,125 B2 | 6/2017 | Bailor et al. |
| 9,686,417 B2 | 6/2017 | Jahr |
| 9,979,500 B2 | 5/2018 | Raman et al. |
| 10,148,482 B2 | 12/2018 | Zait et al. |
| 10,178,217 B2 | 1/2019 | Corbin et al. |
| 10,225,275 B1 | 3/2019 | Xu et al. |
| 10,397,043 B2 | 8/2019 | Tapia et al. |
| 10,404,865 B2 | 9/2019 | Baldwin et al. |
| 10,949,869 B1 | 3/2021 | Gailloux |
| 11,271,796 B2 | 3/2022 | Tapia et al. |
| 2002/0033416 A1 | 3/2002 | Gerszberg et al. |
| 2004/0192339 A1 | 9/2004 | Wilson et al. |
| 2005/0174944 A1 | 8/2005 | Legault et al. |
| 2005/0191989 A1 | 9/2005 | Plush et al. |
| 2005/0195743 A1 | 9/2005 | Rochberger et al. |
| 2005/0233733 A1 | 10/2005 | Roundtree et al. |
| 2005/0289047 A1 | 12/2005 | Oliver et al. |
| 2006/0140369 A1 | 6/2006 | Altmann et al. |
| 2006/0141983 A1 | 6/2006 | Jagannathan et al. |
| 2006/0143026 A1 | 6/2006 | Jagannathan et al. |
| 2006/0143027 A1 | 6/2006 | Jagannathan et al. |
| 2010/0121744 A1 | 5/2010 | Belz et al. |
| 2013/0086252 A1 | 4/2013 | Cutler et al. |
| 2014/0169216 A1 | 6/2014 | Månsson et al. |
| 2015/0087323 A1* | 3/2015 | Srikanteswara ...... H04W 16/04 455/452.1 |
| 2015/0142649 A1 | 5/2015 | Rathod |
| 2015/0193855 A1 | 7/2015 | Costelloe |
| 2015/0207720 A1 | 7/2015 | Dagum et al. |
| 2015/0310496 A1 | 10/2015 | Hersch et al. |
| 2016/0203509 A1 | 7/2016 | Sharp et al. |
| 2018/0212837 A1 | 7/2018 | Kalluri et al. |
| 2021/0142364 A1 | 5/2021 | Umeh et al. |
| 2021/0211190 A1 | 7/2021 | Kubba et al. |
| 2021/0243309 A1 | 8/2021 | Stepnioski et al. |
| 2022/0327585 A1* | 10/2022 | Magoon ............ G06Q 30/0282 |

FOREIGN PATENT DOCUMENTS

| | | |
|---|---|---|
| KR | 20010012598 A | 2/2001 |
| KR | 102121649 B1 | 6/2020 |
| WO | 9507593 A2 | 3/1995 |
| WO | 0213501 A1 | 2/2002 |
| WO | 2005026876 A2 | 3/2005 |
| WO | 2005124611 A1 | 12/2005 |
| WO | 2007145804 A2 | 12/2007 |
| WO | 2009053955 A2 | 4/2009 |
| WO | 2013151529 A2 | 10/2013 |
| WO | 2014116286 A2 | 7/2014 |
| WO | 2014116983 A1 | 7/2014 |
| WO | 2014209690 A1 | 12/2014 |
| WO | 2015159131 A1 | 10/2015 |
| WO | 2015159303 A2 | 10/2015 |
| WO | 2017083138 A1 | 5/2017 |
| WO | 2018157955 A1 | 9/2018 |

* cited by examiner

MODIFYING MOBILE DEVICE CONDITIONS OR STATES SYSTEMS AND METHODS

BACKGROUND

Telecommunication service providers and other organizations employ agents to conduct interactions with subscribers. As used herein, "subscribers" includes subscribers or customers of an organization and potential customers or subscribers. Interactions between agents and subscribers can occur via various means of communication, including telephonically or via an online chat feature. Agents use one or more computing systems to interact with the subscribers and/or to access resources and information to respond to inquiries from subscribers. Interactions between subscribers and agents can relate to a subscriber mobile device and/or use of the subscriber mobile device to access one or more networks provided by the telecommunications service provider.

BRIEF DESCRIPTION OF THE DRAWINGS

Detailed descriptions of implementations of the present invention will be described and explained through the use of the accompanying drawings.

Figure 1:
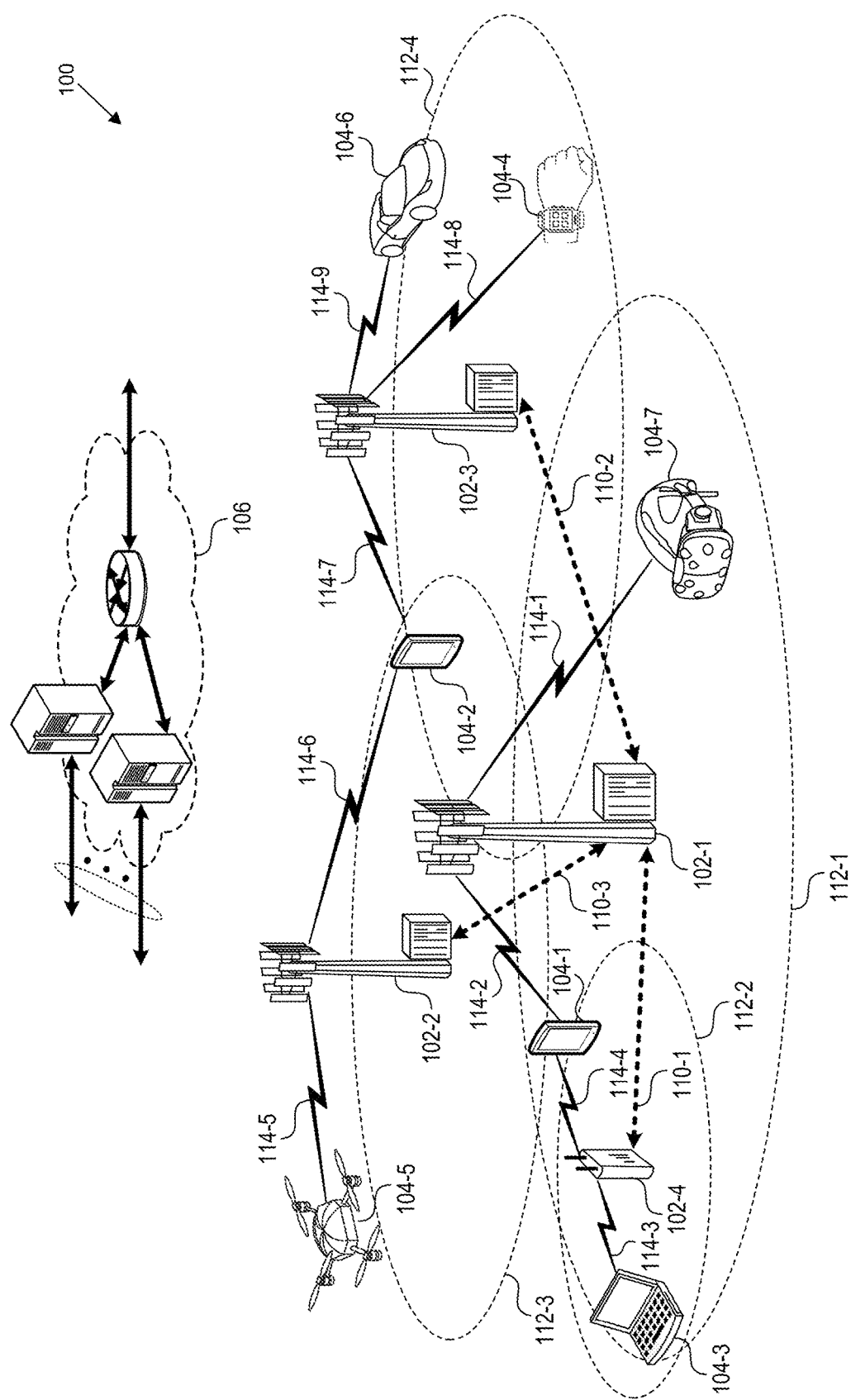
FIG. 1 is a block diagram that illustrates a wireless communication network in which aspects of the present technology can be implemented in some embodiments.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Subscribers contact telecommunications service providers for various reasons related to services and/or products provided by the telecommunications service providers via one or more networks, such as to discuss devices, services, subscriber plans, technical issues, and so forth. To respond to subscribers, telecommunications service providers typically must ascertain various information, which can relate to conditions or states of mobile devices or other user equipment and/or conditions or states related to the one or more networks. Telecommunication service providers face difficult technical challenges related to ascertaining and responding to these conditions or states in an efficient and timely manner. Conditions or states can include, without limitation, error conditions (e.g., of a device or network component), device states (e.g., performance of a user equipment, settings of a user equipment, modes of a user equipment, capabilities of a device, presence/absence of a device or component, availability of a new or replacement device, indications of a compromised device), service states (e.g., performance of a service provided via a network, availability of new or different services), or network and/or device usage (e.g., usage and/or issues in particular locations).

Subscribers may initiate various interactions with agents of the telecommunications service provider, such as interactions related to purchasing or upgrading a device to access the network, troubleshooting a device or service (e.g., technical issues related to mobile devices or telecommunication services), diagnosing a condition or state related to a device or a network, and so forth. During the interactions, subscribers and agents can discuss information related to the condition or state, such as slow performance, dropped calls, accessed or desired services, device behaviors, and so forth.

These interactions can occur via various communication channels, such as telephone calls and/or online chat features. However, agents typically have only limited information available to them during these interactions. Existing systems for responding to subscriber inquiries about a condition or state are typically unable to quickly access data from other sources (e.g., subscriber databases, mobile device manufacturers, network hardware databases). Even if supplemental data is available (e.g., subscriber data), existing systems may only provide manual access to such other sources. Thus, agents are burdened with having to manually access additional data sources to help respond to a described condition or state while simultaneously interacting with the subscriber. Additionally, agents may lack specialized technical knowledge related to specific devices or services, which limits the agents' ability to diagnose and respond to a condition or state.

Due to these and other technical limitations of existing systems, responses to subscriber inquiries about conditions or states are typically slow and based on incomplete information, which can result in subscriber dissatisfaction and various technical problems. For example, when a subscriber inquires about acquiring a mobile device or service, an agent may recommend a device or service that does not meet the needs of the subscriber's typical usage pattern because this pattern is not readily available to the agent. As a further example, a subscriber may describe a condition or state related to the subscriber's use of the network (e.g., problems with a device, problems with a service, a need for an added service), but the agent may be unable to properly diagnose and/or respond to the condition or state because the agent lacks quick access (e.g., in real time or near-real time) to information necessary to identify the condition or state and provide an appropriate response. Sometimes, an agent may benefit from accessing/receiving additional information prior to engaging with the subscriber (e.g., accepting the call, continuing the chat session, etc.), and existing systems typically do not allow for automatic retrieval of this additional information prior to engaging with the subscriber. Furthermore, existing systems may not have ready access to all systems containing relevant information, which can cause inconsistent and/or incomplete information to be used and provided to subscribers.

Accordingly, there is a need for a technical solution that overcomes the foregoing problems and provides other benefits. For example, there is a need for a solution that automatically retrieves data in response to interactions with a subscriber and generates recommendations for responding to a condition or state associated with the subscriber's use of a network using the retrieved data. Additionally, there is a need for a solution that can retrieve subscriber data and/or generate recommendations in real time or near-real time. Furthermore, there is a need for a solution that automatically generates recommendations of actions to take in response to a condition or state, such as actions to modify a network or components or nodes thereof, actions to modify a user equipment (e.g., change a setting or state, install software updates), or actions to recommend a new user equipment to a subscriber.

Disclosed herein are systems and related methods for generating recommendations to respond to a condition or state associated with a subscriber's access to a network provided by a telecommunications service provider ("system" or "network usage recommendation system"). The disclosed system receives a set of interactions between an agent of a telecommunications service provider and a subscriber of the telecommunications service provider. The set of interactions can comprise, for example, messages exchanged between the agent and the subscriber (e.g., via a chat feature of a website or text messaging) and/or audio data for a call between the agent and the subscriber (e.g., transcribed audio data). In the set of interactions, the agent and the subscriber discuss the subscriber's use of a mobile device to access a network provided by the telecommunications service provider. Based on the interactions, the system identifies and accesses subscriber data, including a coverage map indicating coverage of the network. Additionally, the system determines a usage pattern characterizing the use of the mobile device to access the network, such as locations where the mobile device accesses the network and/or activities conducted via the network. A network usage analysis model provided by the system uses the interactions, the subscriber data, and the usage pattern to recommend one or more actions to respond to a condition or state associated with the mobile device. The actions can include modifying a device state of the mobile device, installing an update on the mobile device, or recommending a different mobile device. Additionally or alternatively, the actions can include actions associated with the network, such as actions to update or upgrade one or more components or nodes in the network and/or actions to add one or more components or nodes to the network (e.g., a microcell, picocell, or femtocell).

In some implementations, the disclosed system uses one or more machine learning models, such as machine learning models trained to identify and access the subscriber data or other data and/or machine learning models trained to generate the recommendations of the one or more actions to respond to the condition or state associated with the mobile device.

Advantages of the disclosed technology include technical improvements to mobile devices and/or telecommunications networks. For example, the disclosed technology provides faster and more accurate recommendations for responding to states or conditions related to mobile devices and/or networks accessed by mobile devices. These recommendations can include recommendations to upgrade, update, replace, add, or modify a mobile device and/or one or more network components or nodes in response to identified error conditions, device states, service states, network states, and/or other states or conditions. Additionally, the disclosed technology recommends actions based on more complete information because the disclosed technology can automatically identify supplemental data sources and proactively/automatically retrieve relevant data for making recommendations.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include picocells, femto cells, and microcells. In general, a picocell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Network Usage Recommendation System

Figure 2:
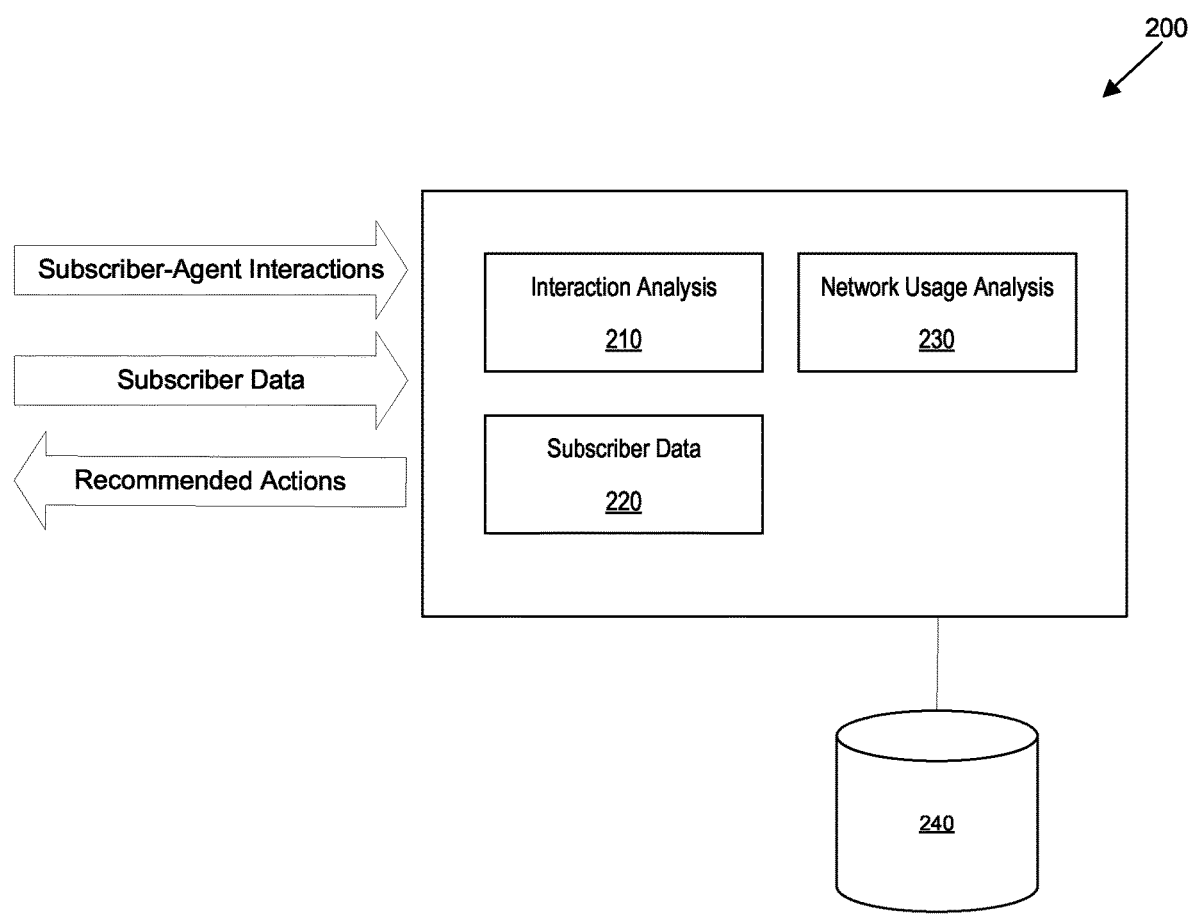
FIG. 2 is a block diagram that illustrates components of a system to generate recommendations in response to a condition or state of a mobile device in some implementations.

FIG. 2 is a block diagram that illustrates components of a system 200 to generate recommendations in response to a condition or state of a mobile device in some implementations. All or portions of the system 200 can be provided, for example, by a telecommunications service provider that provides all or portions of the network 100 using one or more components of the network 100. The system 200 can include functional modules that are implemented with a combination of software (e.g., executable instructions or computer code) and hardware (e.g., one or more memories and one or more processors). Accordingly, as used herein, in some examples a module can be a processor-implemented module or set of code and represents a computing device having one or more processors that are at least temporarily configured and/or programmed by executable instructions carried in one or more memories to perform one or more of the functions described herein.

The system 200 comprises an interaction analysis module 210, a subscriber data module 220, and/or a network usage analysis module 230, which are each described separately below. Additionally, the system 200 comprises a storage component 240 which can be used to store and/or access data for or used by the system 200, such as training datasets, interaction data, subscriber data, and so forth. The storage component 240 comprises one or more of local storage, storage on a server system or on the cloud, or a combination thereof.

Interaction Analysis Module

The interaction analysis module 210 receives and analyzes sets of interactions between subscribers of a telecommunications service provider and agents of the telecommunications service provider. Each set of interactions can comprise messages (e.g., chat messages or text messages) exchanged between the subscriber and the agent. Additionally or alternatively, each set of interactions can comprise audio data of a call (e.g., a voice or video call) between the subscriber and the agent, which is transcribed in some implementations. In some implementations, the interaction analysis module 210 transcribes call audio for further processing and/or analysis. Interactions can be received in various formats, such as in plaintext files or messages, audio files (e.g., WAV or MP3 files), word processing files, and so forth. Interactions can be received in real time or near-real time (e.g., while the interaction is ongoing) and/or in batches representing multiple sets of interactions (e.g., during a certain time period).

The interaction analysis module 210 can process and/or analyze the sets of interactions in various ways. For example, the interaction analysis module 210 can apply intent analysis to determine one or more intents for a set of interactions. An intent can characterize a reason for the interactions and/or a topic or subject discussed in the interactions. For example, intent analysis can indicate whether a subscriber wishes to inquire about a particular device or service, whether a subscriber needs help troubleshooting a problem, whether a user would like to buy a new device (e.g., to replace an existing mobile device), and so forth. Additionally or alternatively, the interaction analysis module 210 can extract and/or identify keywords or phrases contained in a set of interactions.

In some implementations, the interaction analysis module 210 performs intent analysis to determine multiple levels of intents. For example, the interaction analysis module 210 performs a first-level intent analysis to determine whether a subscriber is a current subscriber or a prospective subscriber. The interaction analysis module 210 can further perform a second-level intent analysis to determine a general topic or issue that the subscriber wishes to discuss, such as a device issue, a network or connectivity issue, payments/billing, device replacement or acquisition, and so forth. Additionally, the interaction analysis module 210 can perform a third-level intent analysis to determine further intents based on the second-level intent analysis. For example, when the second-level intent is determined to be a "device issue," potential third-level intents may relate to specific kinds of device issues, such as device speed (e.g., slow performance), device applications (e.g., installed or desired applications), boot or reboot issues, hardware issues (e.g., input/output issues, screen issues), and so forth. Although three levels of intent analysis are described, a greater or lesser number of levels can be used. For example, additional levels of intent analysis can be used, with each additional level adding more specificity to the potential intents that can be determined.

In some implementations, the interaction analysis module 210 gathers and/or analyzes metadata and/or contextual data associated with sets of interactions. For example, the interaction analysis module 210 gathers device information (e.g., identifier(s) and/or model or version information) associated with a device via which a subscriber participates in interactions. The interaction analysis module 210 can gather metadata and/or contextual data associated with a subscriber, such as a current location of a subscriber (e.g., using geolocation data), purchase/order history, current financial information (e.g., whether the subscriber's current bill is paid or unpaid), language(s) spoken, current mood or sentiment (e.g., to determine whether a call should be directed to a retention specialist), and so forth. Additionally or alternatively, the interaction analysis module 210 can determine browser history and/or other internet history preceding and/or associated with a set of interactions (e.g., to determine pages accessed by a subscriber to attempt to resolve an issue). These and other kinds of metadata and/or contextual data are used by the system 200, for example, to train machine learning models and/or to generate recommendations of actions to respond to identified states and/or conditions.

Subscriber Data Module

The subscriber data module 220 identifies, accesses, and/or stores various data associated with subscribers, devices associated with subscribers, and/or networks accessed using devices associated with subscribers. This data can include coverage maps indicating coverage of one or more networks in multiple locations. Additionally or alternatively, the data can include subscriber data comprising services and/or devices used by a subscriber, subscription information, usage history, demographic information, financial information, and so forth.

In some implementations, the subscriber data module 220 generates, identifies, and/or accesses usage patterns that each characterize use of a network by a mobile device associated with a subscriber. A usage pattern can indicate, for example, locations where a mobile device has accessed the network and/or activities conducted via the network.

In some implementations, the subscriber data module 220 identifies and accesses one or more data sources to retrieve relevant data for generating recommended actions to respond to an identified condition or state (e.g., of a mobile device and/or network). For example, the subscriber data module 220 can use various data associated with a set of interactions (e.g., an intent associated with the interactions, a subscriber or device identifier, keywords in the interactions) to automatically identify relevant data sources and retrieve data from the data sources. In some implementations, the subscriber data module 220 identifies relevant data sources and/or retrieves data based on metadata and/or contextual data gathered by the interaction analysis module 210. For example, the subscriber data module 220 can identify a subscriber based on an identifier associated with a set of interactions (e.g., a phone number or user name) and automatically retrieve subscriber data for the identified subscriber from one or more databases containing subscriber data (e.g., demographic data, plan information, usage history, financial information). In some implementations, the subscriber data module 220 can identify and retrieve relevant data from third-party services, such as commercial services that sell customer data. In some implementations, the subscriber data module 220 can identify and retrieve data related to one or more networks, such as data related to nodes or components of a network in a geographic region associated with a subscriber and/or discussed in a set of interactions. In some implementations, the subscriber data module 220 can identify and access data associated with devices, such as mobile devices, which can be retrieved from public sources (e.g., the internet), device manufacturers, vendors, and/or other locations.

In some implementations, the subscriber data module 220 retrieves subscriber data associated with multiple sets of interactions and/or other contacts corresponding to a same subscriber. For example, the subscriber data module 220 identifies a specific subscriber present in a set of interactions and automatically identifies other sets of interactions or other contacts associated with the specific subscriber, such as website visits, calls, chat sessions, search history, and so forth. The subscriber data module 220 then retrieves data associated with the identified other sets of interactions or other contacts for the specific subscriber.

In some implementations, the subscriber data module 220 provides, trains, and/or uses one or more machine learning models to identify and access data, as will be described in additional detail herein. For example, one or more machine learning models can receive a set of interactions and/or intents or analyses of interactions and automatically access relevant data sources using the set of interactions, intents, and/or analyses. Data from the relevant data sources can then be used to generate recommended actions, as described herein below.

Network Usage Analysis Module

The network usage analysis module 230 provides one or more network usage analysis models that generate recommendations of actions to respond to conditions or states associated with mobile devices. The one or more network usage analysis models receive various data, including sets of interactions analyzed using the interaction analysis module 210, subscriber data and/or other data retrieved using the subscriber data module 220, network coverage information, subscriber and/or device usage patterns, and/or network usage information. Using the received data, the network usage analysis module 230 recommends one or more actions to respond to a condition or state associated with a device and/or a network accessed using the device. Table 1 below illustrates examples of conditions or states and corresponding actions that the network usage analysis module 230 can recommend.

TABLE 1

| Condition or Status | Recommended Action |
| --- | --- |
| Frequent dropped calls | Change a device setting, state, or mode |
| | Install software update |
| Inadequate network coverage in specific locations | Install picocell, microcell, or femtocell |
| Unable to access specific network services | Conduct capability check |
| | Replace device |
| | Recommend a different subscriber plan |
| New device needed to access certain network services | Offer specific device based on subscriber plan, subscriber characteristics, usage history/pattern, coverage map, and so forth |
| Frequent unwanted/unsolicited calls or texts and/or | Recommend security measures, such as spam blocking technologies |

TABLE 1-continued

| Condition or Status | Recommended Action |
| --- | --- |
| compromised device | Change settings and/or modes to diagnose or prevent problems |
| Device storage maxed out | Offer additional storage, such as cloud storage |
| | Recommend new device and/or device accessories (e.g., expanded memory) |
| Change in usage pattern | Check for compromised device |
| | Recommend different device(s) and/or service(s) to better fit usage pattern |
| Frequent international travel (e.g., based on device geolocation) | Recommend change in service(s) and/or feature(s) based on travel destinations |

In some implementations, the network usage analysis module 230 can receive and/or analyze network usage data. For example, the network usage analysis module 230 can generate usage patterns that characterize the use of various mobile devices to access one or more networks provided by a telecommunications service provider. These usage patterns can be specific to a subscriber or group of subscribers and/or generally applicable to many users of the one or more networks. Each usage pattern can describe or relate to locations where mobile devices access the one or more networks and/or activities conducted via the one or more networks (e.g., traffic types, quantities of data sent/received, session information). Usage patterns can be used by one or more network usage analysis models to generate recommended actions for responding to states and/or conditions, as described herein.

Usage patterns can comprise various data characterizing usage of a device and/or a network, such as device geolocation, locations and/or identifiers of network towers or sites used to access the network, device information (e.g., called and/or calling device type, capabilities, processor information, memory information), search history and/or other internet history, quantities of data transmission, times of day when usage occurs, types of activities conducted over the network, and/or changes in any of the foregoing characteristics.

In some implementations, the one or more network usage analysis models provided by the network usage analysis module 230 comprise machine learning models that are trained to generate recommendations of actions to respond to conditions or states associated with mobile devices. For example, one or more machine learning models can receive a set of interactions and/or intents or analyses of interactions, subscriber data, usage data/patterns, network data (e.g., coverage maps), and/or other supplemental data or analyses and generate, based on the received data and/or analyses, recommended actions for responding to a condition or state associated with a mobile device and/or a network.

A "model" as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the network usage analysis model can be a neural network with multiple input nodes that receive network usage data (e.g., interaction data, subscriber data, usage patterns). The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used to recommend one or more actions to respond to a condition or state, as described herein. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data includes interactions, subscriber data, and/or usage patterns as input and a desired output, such as a recommended action and/or a corresponding condition or state. In some implementations, the desired output additionally or alternatively includes subscriber data or other data to be retrieved based on interactions. The mode can be trained by comparing an output of the model to the desired output and, based on the comparison, the model can be modified, such as by changing weights between nodes of the neural network or parameters of the functions used at each node in the neural network (e.g., applying a loss function). After applying the training data and modifying the model in this manner, the model can be trained to evaluate new data items, such as interactions, subscriber data, supplemental data, and/or usage patterns.

Machine Learning Model Training

Figure 3:
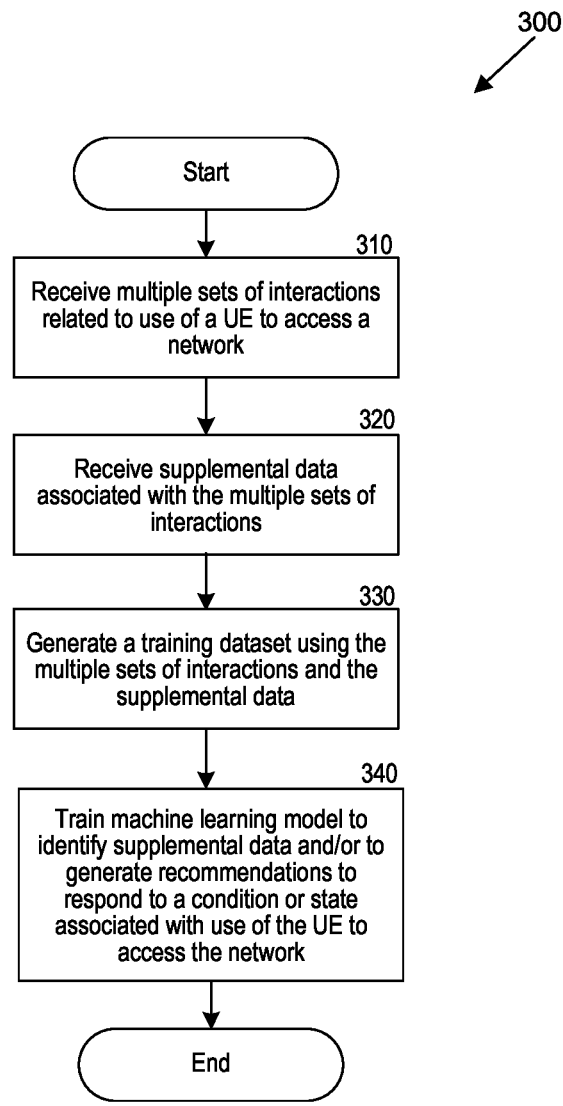
FIG. 3 is a flow diagram that illustrates a process to train a machine learning model to identify supplemental data and/or generate recommendations to respond to a condition or state associated with accessing a network in some implementations.

FIG. 3 is a flow diagram that illustrates a process 300 to train a machine learning model to identify supplemental data and/or generate recommendations to respond to a condition or state associated with a mobile device in some implementations. The process 300 can be performed, at least in part, by the system 200 of FIG. 2. For example, the subscriber data module 220 can perform the process 300 to train a machine learning model to identify and access supplemental data. Additionally or alternatively, the network usage analysis module 230 can perform the process 300 to train a network usage analysis model to generate recommended actions to respond to a condition or state associated with a mobile device.

The process 300 begins at block 310, where the system receives interaction data for multiple interactions between subscribers of a telecommunications service provider and agents of the telecommunications service provider. The multiple interactions can comprise sets of interactions, each set representing messages (e.g., chat messages or text messages) exchanged between the agent and the subscriber. Additionally or alternatively, each set of interactions can comprise audio data for a call (e.g., a voice call and/or video call) between the agent and the subscriber. In some implementations, the system transcribes the audio data or receives the audio data as transcribed call audio. The multiple interactions can comprise a large number of sets of interactions, such as hundreds or thousands of sets of interactions. Each set of interactions relates to a subscriber's use of a mobile device to access a network provided by a telecommunications service provider. Additionally, each set of interactions is associated with a corresponding action taken in response to the set of interactions, such as an action relating to a condition or state of the mobile device. Examples of actions include modifying a device state of the mobile device, installing an update on the mobile device, or recommending a different mobile device to access the network At block 320, the system receives supplemental data associated with at least some of the multiple interactions between the subscribers of the telecommunications service provider and the agents of the telecommunications service provider. The supplemental data can include subscriber data comprising a coverage map indicating coverage of the network, demographic data, or device data. Additionally or alternatively, the supplemental data can include a usage pattern characterizing the use of the mobile device to access the network provided by the telecommunications service provider. In some implementations, the supplemental data can include data from third-party sources (e.g., market research data), other subscriber data, and/or network data (e.g., network usage data).

At block 330, the system generates a training dataset using the received interaction data for the multiple interactions and the received supplemental data. Generating the training dataset can comprise associating data for each set of interactions in the multiple interactions (e.g., subscriber data and/or interaction data) with one or more desired outputs. The desired outputs can be conditions or states associated with a subscriber's access to the network using a mobile device or other user equipment and/or one or more recommended actions for responding to the conditions or states. In some implementations, desired outputs can include one or more data sources to be accessed based on the interaction data. Additionally, generating the training dataset can comprise applying intent analysis to at least some of the multiple sets of interactions to determine an intent.

At block 340, the system uses the generated training dataset to train one or more machine learning models. For example, the system can train a machine learning model to generate recommended actions to respond to conditions or states associated with mobile devices based on a received set of interactions, received subscriber data (e.g., a coverage map, demographic data, plan information, financial information), received network data, and/or a received usage pattern. Additionally or alternatively, the system can train a machine learning model to automatically identify and access relevant data to generate the recommended actions. In some implementations, the system can train the machine learning model to identify the conditions or states associated with the mobile devices for which the actions are recommended.

Once the machine learning model has been trained, the trained machine learning model can be applied in various ways. For example, the trained machine learning model can be applied to recommend one or more actions to respond to a particular condition or state associated with a particular mobile device and based on a particular set of interactions between a particular subscriber and a particular agent related to using the particular mobile device to access the network provided by the telecommunications service provider.

In some implementations, the process 300 further includes evaluating the trained machine learning model, such as using a test dataset. For example, the trained machine learning model can be applied to the test dataset, which can comprise multiple sets of interactions between subscribers and agents and supplemental data corresponding to the sets of interactions. Outputs of the machine learning model can then be compared to expected outputs, such as by comparing actions recommended by the trained machine learning model to expected actions specified in the test dataset. In some implementations, the trained machine learning model is evaluated periodically (e.g., daily, weekly, monthly, quarterly, yearly, etc.) and/or as needed to determine whether the accuracy of the model exceeds a threshold accuracy (e.g., 80%, 90%, 95%, etc.).

If the accuracy of the model does not exceed the threshold accuracy then the model can be retrained. Retraining the machine learning model can include training the machine learning model at least a second time using the same training dataset, training the machine learning model with a different (e.g., expanded) training dataset, applying different weightings to a training dataset, rebalancing a training dataset, and so forth. Through retraining, the model can be made more accurate, such as to correct for variances between expected outcomes and actual outcomes (e.g., expected actions and recommended actions) and/or to correct for model drift (e.g., degradation in model performance over time due to a change in environment, data patterns, assumptions underlying a model, etc.) Various techniques can be used to train and/or retrain the machine learning model. For example, adaptive boosting can be used, which is an iterative process that runs multiple tests on a collection of training data. Adaptive boosting transforms a weak learning algorithm (e.g., an algorithm that performs at a level only slightly better than chance) into a strong learning algorithm (an algorithm that displays a low error rate, e.g., below a threshold error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting can use, for example, weak classifiers that are single-split trees with only two leaf nodes.

Recommending Actions to Respond to a Condition or State

Figure 4:
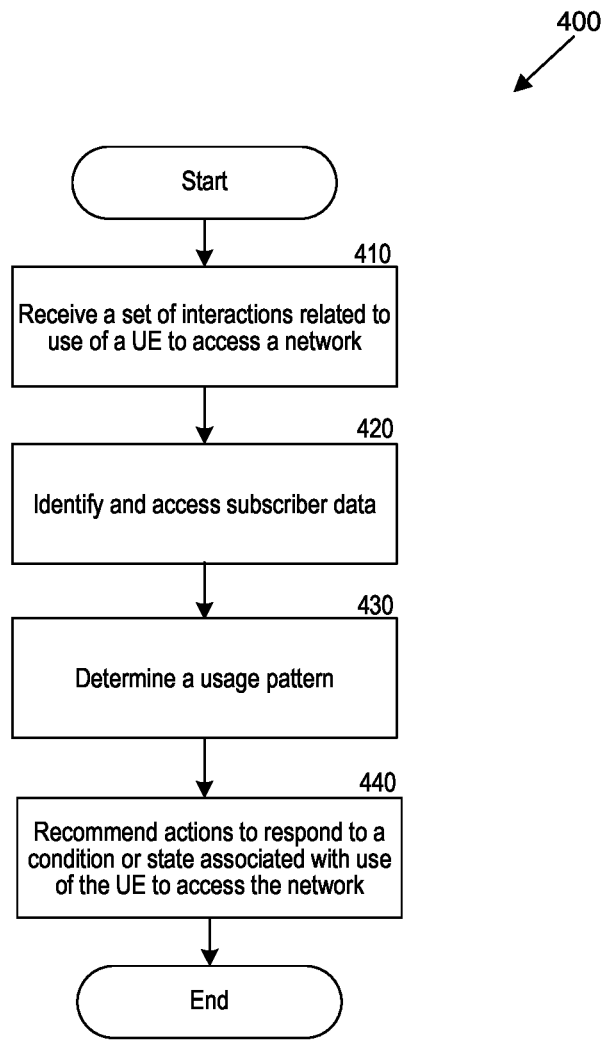
FIG. 4 is a flow diagram that illustrates a process to recommend actions to respond to a condition or state associated with accessing a network in some implementations.

FIG. 4 is a flow diagram that illustrates a process 400 to recommend actions to respond to a condition or state associated with accessing a network in some implementations. The process 400 can be performed, at least in part, using the system 200 of FIG. 2, such as using a network usage analysis model provided by the network usage analysis module 230.

The process 400 begins at block 410, where the system receives a set of interactions between an agent of a telecommunications service provider and a subscriber of the telecommunications service provider. The set of interactions can comprise one or more messages exchanged between the agent and the subscriber and/or transcribed audio of an call or other exchange between the agent and the subscriber. The set of interactions relates to use, by the subscriber, of a mobile device to access a network provided by the telecommunications service provider.

At block 420, the system identifies and accesses subscriber data for the subscriber based, at least in part, on the set of interactions between the agent and the subscriber. The subscriber data includes a coverage map indicating coverage of the network in multiple locations, such as locations defining a particular geographic region and/or locations associated with the subscriber. Subscriber data can also include demographic data, plan information, financial information, device information, and/or other data associated with a subscriber. In some implementations, data identified and accessed at block 420 can further include supplemental data, such as network data, third-party data, technical data for a mobile device or a node or component of a network, and so forth. In some implementations, the subscriber data and/or supplemental data are identified and accessed using a machine learning model that is trained to identify and access relevant data sources based on sets of interactions. In some implementations, the subscriber data and/or supplemental data are identified and accessed based on intent analysis of the set of interactions.

At block 430, the system determines a usage pattern characterizing the use of the mobile device to access the network provided by the telecommunications service provider. The usage pattern relates to locations where the mobile device accesses the network and/or activities conducted via the network. For example, the usage pattern can indicate typical locations where the mobile device is used to access the network, which can be ranked based on frequency of access at each location. Additionally or alternatively, the usage pattern can indicate types and/or volumes of network traffic associated with different kinds of activities, such as voice calling, video calling, messaging, streaming, gaming, application usage, and so forth.

At block 440, the system applies a network usage analysis model to recommend one or more actions to respond to a condition or state associated with the mobile device. The network usage analysis model can comprise, for example, a machine learning model. The recommended one or more actions are based on the set of interactions, the subscriber data and/or supplemental data, and the usage pattern. In some implementations, the recommended one or more actions are further based on intent analysis of the set of interactions. The actions can include, for example, modifying a device state of the mobile device, installing an update on the mobile device, or recommending a different mobile device to access the network. Additionally or alternatively, the actions can be to respond to a condition or state related to the network, such as a condition or state of a component or node of the network. In these and other implementations, the recommended actions can include modifying a component or node of the network, replacing a component or node of the network, and/or adding a microcell, a picocell, or a femtocell to the network.

In some implementations, the process 400 can be performed in real time or near-real time, such as while the interactions between the agent and the subscriber are ongoing. For example, the process 400 can be performed using a computing system of the agent, and the agent can receive recommendations for responding to the subscriber while a call or chat session is occurring. In these and other implementations, the process 400 can include causing display of the subscriber data and/or supplemental data and/or the recommendations of the actions on a display screen of the computing system.

The processes 300 and/or 400 can be performed in various orders, including performing one or more operations in parallel and/or repeating one or more operations. Additionally, operations can be added to and/or omitted from the processes 300 and 400 while maintaining a similar functionality.

Computing System

Figure 5:
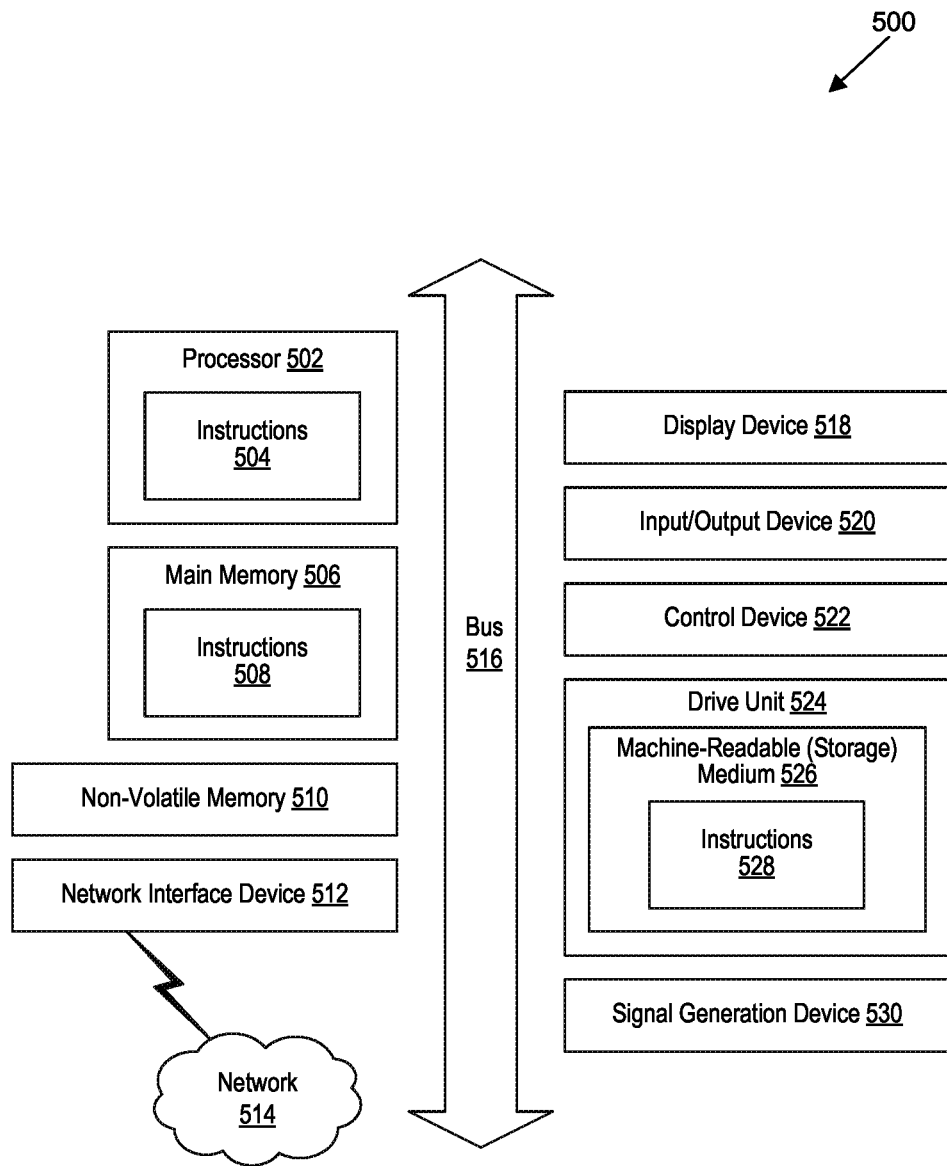
FIG. 5 is a block diagram that illustrates an example of a computing system in which at least some operations described herein can be implemented.

FIG. 5 is a block diagram that illustrates an example of a computing system 500 in which at least some operations described herein can be implemented. As shown, the computing system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computing system 500 is intended to illustrate a hardware device on which components illustrated or described relative to the examples of the figures and any other components described in this specification can be implemented.

The computing system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computing system 500 can be an embedded computer system, a system-on-chip (SOC), a single-board computer system (SBC) or a distributed system such as a mesh of computer systems or include one or more cloud components in one or more networks. Where appropriate, one or more computing systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A non-transitory computer-readable medium carrying instructions that, when executed by a computing system, cause the computing system to perform operations to modify a condition or state of mobile devices, the operations comprising:
receiving a set of interactions between an agent of a telecommunications service provider and a subscriber of the telecommunications service provider,
wherein the set of interactions comprises one or more of: messages exchanged between the agent and the subscriber, or transcribed audio of an exchange between the agent and the subscriber, and
wherein the set of interactions relates to use, by the subscriber, of a mobile device to access a network provided by the telecommunications service provider;
identifying and accessing subscriber data for the subscriber based, at least in part, on the set of interactions between the agent and the subscriber,
wherein the subscriber data includes a coverage map indicating coverage of the network in multiple locations;
determining a usage pattern characterizing the use of the mobile device to access the network provided by the telecommunications service provider,
wherein the usage pattern relates to locations where the mobile device accesses the network and activities conducted via the network; and
using the set of interactions, the subscriber data, and the usage pattern, applying a trained network usage analysis model to recommend at least one action to respond to a condition or state associated with the mobile device,
wherein the at least one action includes modifying a device state of the mobile device, installing an update on the mobile device, or recommending a different mobile device to access the network, and
wherein the network usage analysis model comprises a machine learning model that has been trained using training data comprising multiple sets of interactions,
wherein each set of interactions corresponds to a corresponding subscriber, a corresponding mobile device, and a corresponding agent of the telecommunications service provider,
wherein each set of interactions comprise one or more of: messages exchanged between the corresponding agent and the corresponding subscriber, or transcribed audio of an exchange between the corresponding agent and the corresponding subscriber,
wherein each set of interactions relate to use, by the corresponding subscriber, of the corresponding mobile device to access a network provided by the telecommunications service provider, and
wherein each set of interactions is associated with a corresponding action taken in response to the set of interactions, the corresponding action relating to a condition or state of the corresponding mobile device.

2. The non-transitory computer-readable medium of claim 1, wherein the operations further comprise:
applying intent analysis to the received set of interactions,
wherein the subscriber data is identified based in part on the intent analysis, and
wherein the trained network usage analysis model further uses the intent analysis to recommend the at least one action.

3. The non-transitory computer-readable medium of claim 1, wherein at least some of the operations are performed while the interactions between the agent and the subscriber are occurring.

4. The non-transitory computer-readable medium of claim 1, wherein the subscriber data includes demographic information about the subscriber or financial information about the subscriber.

5. The non-transitory computer-readable medium of claim 1, wherein the operations further comprise:
casing display of the subscriber data, the recommendation of the at least one action, or both the subscriber data and the recommendation of the at least one action.

6. The non-transitory computer-readable medium of claim 1, wherein the condition or state associated with the mobile device relates to the network provided by the telecommunications service provider or a component or node of the network.

7. The non-transitory computer-readable medium of claim 1, wherein the recommended at least one action includes modifying a component or node of the network provided by the telecommunications service provider, replacing a component or node of the network provided by the telecommunications service provider, or adding a microcell, a picocell, or a femtocell to the network provided by the telecommunications service provider.

8. The non-transitory computer-readable medium of claim 1, wherein the operations further comprise:
identifying and accessing technical data for the mobile device, the network provided by the telecommunications service provider, or both the mobile device and the network.

9. A computer-implemented method of modifying a condition or state of mobile devices, the method comprising:
receiving a set of interactions between an agent of a telecommunications service provider and a subscriber of the telecommunications service provider,
wherein the set of interactions comprises one or more of: messages exchanged between the agent and the subscriber, or transcribed audio of an exchange between the agent and the subscriber, and
wherein the set of interactions relates to use, by the subscriber, of a mobile device to access a network provided by the telecommunications service provider;
identifying and accessing subscriber data for the subscriber based, at least in part, on the set of interactions between the agent and the subscriber,
wherein the subscriber data includes a coverage map indicating coverage of the network in multiple locations;
determining a usage pattern characterizing the use of the mobile device to access the network provided by the telecommunications service provider,
wherein the usage pattern relates to locations where the mobile device accesses the network and activities conducted via the network; and
using the set of interactions, the subscriber data, and the usage pattern, applying a network usage analysis model to recommend at least one action to respond to a condition or state associated with the mobile device,
wherein the at least one action includes modifying a device state of the mobile device, installing an update on the mobile device, or recommending a different mobile device to access the network, and
wherein the network usage analysis model comprises a machine learning model that has been trained using training data comprising multiple sets of interactions,
wherein each set of interactions corresponds to a corresponding subscriber, a corresponding mobile device and a corresponding agent of the telecommunications service provider,
wherein each set of interactions comprise one or more of: messages exchanged between the corresponding agent and the corresponding subscriber, or transcribed audio of an exchange between the corresponding agent and the corresponding subscriber,
wherein each set of interactions relate to use, by the corresponding subscriber, of the corresponding mobile device to access a network provided by the telecommunications service provider, and
wherein each set of interactions is associated with a corresponding action taken in response to the set of interactions, the corresponding action relating to a condition or state of the corresponding mobile device.

10. The computer-implemented method of claim 9, further comprising:
applying intent analysis to the received set of interactions,
wherein the subscriber data is identified based in part on the intent analysis, and
wherein the applied network usage analysis model further uses the intent analysis to recommend the at least one action.

11. The computer-implemented method of claim 9, wherein at least some of the method is performed while the interactions between the agent and the subscriber are occurring.

12. The computer-implemented method of claim 9, wherein the subscriber data includes demographic information about the subscriber or financial information about the subscriber.

13. The computer-implemented method of claim 9, further comprising:
causing display of the subscriber data, the recommendation of the at least one action, or both the subscriber data and the recommendation of the at least one action.

14. The computer-implemented method of claim 9, wherein the condition or state associated with the mobile device relates to the network provided by the telecommunications service provider or a component or node of the network.

15. The computer-implemented method of claim 9, wherein the recommended at least one action includes modifying a component or node of the network provided by the telecommunications service provider, replacing a component or node of the network provided by the telecommunications service provider, or adding a microcell, a picocell, or a femtocell to the network provided by the telecommunications service provider.

16. The computer-implemented method of claim 9, further comprising:
identifying and accessing technical data for the mobile device, the network provided by the telecommunications service provider, or both the mobile device and the network.

17. A non-transitory computer-readable medium carrying instructions that, when executed by a computing system, cause the computing system to perform operations to train a machine learning model to generate recommendations to modify a condition or state associated with mobile devices, the operations comprising:
receiving multiple sets of interactions between agents of a telecommunications service provider and subscribers of the telecommunications service provider,
wherein each set of interactions of the multiple sets of interactions comprise one or more of: messages exchanged between an agent and a subscriber, or transcribed audio of an exchange between the agent and the subscriber, wherein each set of interactions of the multiple sets of interactions relate to use, by the subscriber, of a mobile device to access a network provided by the telecommunications service provider, and wherein each set of interactions of the multiple sets of interactions are associated with a corresponding action taken in response to the set of interactions, the corresponding action relating to a condition or state of the mobile device;

receiving supplemental data for at least some sets of interactions of the multiple sets of interactions, the supplemental data comprising at least one of:

subscriber data comprising a coverage map indicating coverage of the network in multiple locations, demographic data, or device data, or a usage pattern characterizing the use of the mobile device to access the network provided by the telecommunications service provider;

using the multiple sets of interactions and the supplemental data to generate a training dataset, wherein intent analysis is applied to each of the multiple sets of interactions to determine an intent of each set of interactions;

using the training dataset to train a machine learning model to generate recommended actions to respond to conditions or states associated with mobile devices, applying the trained machine learning model to recommend at least one action to respond to a particular condition or state associated with a particular mobile device, wherein the recommended at least one action is based on a particular set of interactions between a particular subscriber and a particular agent related to use, by the particular subscriber, of the particular mobile device to access the network provided by the telecommunications service provider.

18. The non-transitory computer-readable medium of claim 17, wherein the machine learning model is further trained to:

identify and access data sources containing the supplemental data; and identify the conditions or states associated with the mobile devices.

19. The non-transitory computer-readable medium of claim 17, wherein the operations further comprise:

evaluating an accuracy of the trained machine learning model using a testing dataset, wherein the testing dataset includes a plurality of sets of interactions between subscribers of the telecommunications service provider and agents of the telecommunications service provider; and retraining the machine learning model with the accuracy does not exceed a threshold accuracy, wherein retraining the machine learning model includes at least one of: training the machine learning model at least a second time using the generated training dataset, resampling at least a portion of the generated training dataset, or training the machine learning model using a different dataset.

* * * * *